Feb. 11, 1930. W. H. BARNER 1,746,575
ROTARY SPRINKLER
Filed Jan. 22, 1929
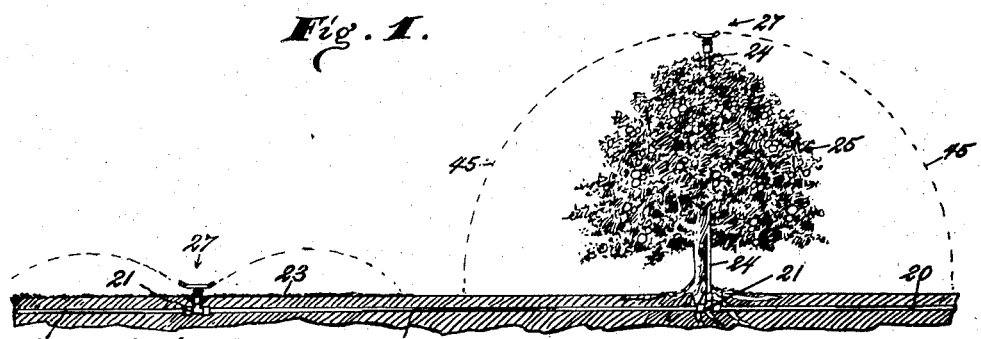
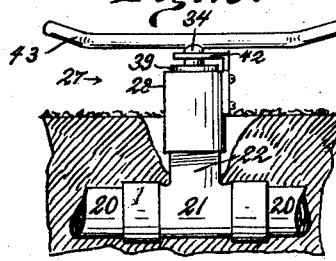
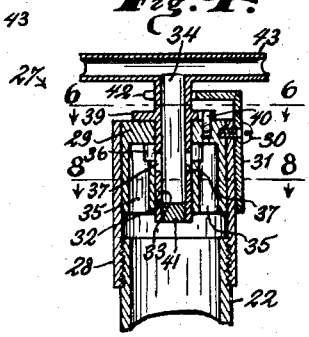
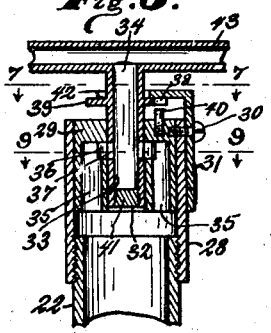
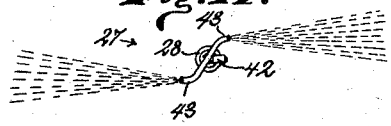
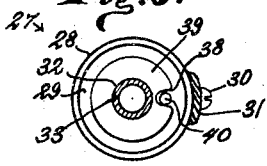
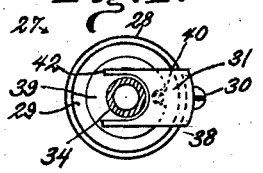
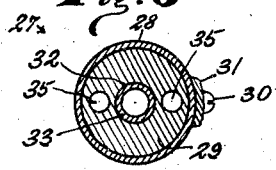
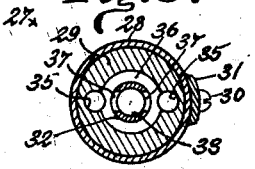
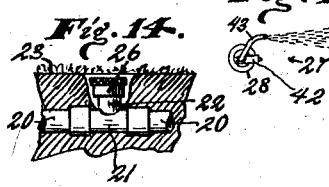
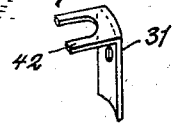
Inventor.
William H. Barner
by
Lockwood & Lockwood,
His Attorneys.

Patented Feb. 11, 1930

1,746,575

UNITED STATES PATENT OFFICE

WILLIAM H. BARNER, OF LOS ANGELES, CALIFORNIA

ROTARY SPRINKLER

Application filed January 22, 1929. Serial No. 334,276.

This invention relates to means for watering and irrigating lawns and the like, and the principal object thereof is to provide a rotary sprinkler adapted to water a circular area with interchangeable means connected therewith for changing the discharge of water from constant to an intermittent spray, so that instead of the entire circular area being watered, as in the first instance, the spray is thrown only in one or more directions to water only a section or sections of the area.

Another object of the invention is to provide a rotary sprayer that is especially adapted for use with underground piped sprinkling systems.

As is well understood, this system includes distributing pipes arranged underground with vertical water or standpipes connected thereto that extend upward near the top surface of lawns, and in orchards extend above the tree tops, and these standpipes are usually provided with stationary nozzles that are removable and replaced with caps when not in use, and one of the objects of the invention is to provide a rotary nozzle for use with these standpipes.

Features of invention are shown in the construction, combination and arrangement of parts whereby a rotary sprayer is provided that is easy to construct, assemble, install and operate, that is neat and pleasing in appearance and effective and durable in use.

A feature of invention is shown in the means for interrupting the rotation of the nozzle when the water pressure is turned off so that the openings in the sides of the nozzle body are in register with discharge ports in the metal plug and so that when again placed in use the water will discharge from the nozzle and the pressure will release it from the stop pin so it is free to again rotate.

Other objects, advantages and features of invention may appear from the accompanying drawing, the subjoined detailed description and the appended claims.

In the drawings:

Fig. 1 is a sectional semidiagrammatic view of an underground sprinkling system for a lawn and orchard showing the standpipes provided with rotary sprinklers that are constructed in accordance with this invention.

Fig. 2 is an enlarged fragmental view of the lawn rotary sprinkler shown in Fig. 1.

Fig. 3 is a plan view of the sprinkler shown in Fig. 2, showing by arrows the direction of rotation.

Fig. 4 is an enlarged fragmental vertical section on line 4—4, Fig. 3, showing the nozzle disk engaged by a stop pin.

Fig. 5 is a section analogous to Fig. 4, showing the nozzle moved endwise of the shell to disengage the disk from the stop pin and also to move the side openings in the nozzle body into complete register with discharge ports in the shell plug.

Fig. 6 is a cross section on line 6—6, Fig. 4, showing the stop pin in a notch in the nozzle disk.

Fig. 7 is a cross section on line 7—7, Fig. 5, showing the top band stop engaged with the nozzle disk.

Fig. 8 is a cross section on line 8—8, Fig. 4, showing one arrangement of the passages in the shell plug.

Fig. 9 is a cross section on line 9—9, Fig. 5, showing the passages in the shell plug connected to an annular chamber around the nozzle body.

Fig. 10 is a cross section analogous to Fig. 9, showing the annular chamber omitted and the passages in the plug connected by ports to the orifices or openings in the nozzle body.

Fig. 11 is a semidiagrammatic view of the rotary sprinkler with the passages and ports in the plug arranged as shown in Fig. 10, illustrating the intermittent discharge of water in two directions when so constructed.

Fig. 12 is a cross section analogous to Fig. 10 showing a single passage and port in the shell plug and also showing a single orifice or opening in the nozzle body so that when in use there will be a single intermittent discharge of water at each revolution of the nozzle.

Fig. 13 is a semidiagrammatic plan view of the rotary sprinkler constructed as illustrated in Fig. 12, showing an intermittent discharge of water in one direction.

Fig. 14 is a sectional view analogous to Fig. 3, showing the rotary sprinkler removed from the standpipe and replaced by a cap.

Fig. 15 is a perspective view of the top stop and plate to which it is connected.

An underground sprinkling system is fragmentally, sectionally and semidiagrammatically indicated in Fig. 1, and it includes the distributor pipes 20 connected by a T-pipe 21 that have short vertical standpipes 22 for lawns 23, and longer vertical pipes 24 for orchard trees 25, and water in these pipes is maintained under pressure when in use so that it discharges from the standpipe with considerable force.

The top ends of the standpipe are usually provided with stationary nozzles, not shown, in these drawings but well understood in the art, and they are replaceable with caps 26, as indicated in Fig. 14.

I provide rotary sprinklers 27 to replace the usual stationary nozzles that are usually secured to the standpipes.

The rotary sprinkler 27 is constructed so it can be detachably connected to either of the standpipes 22 or 24 so that in the first instance it can be removed from the pipe 22 so as to not be in the way when the lawn 23 is to be cut by a lawnmower or surfaced with tools such as rakes and the like; and also so the sprinklers will not interfere with games when the lawns are used for that purpose.

The rotary sprinkler 27 includes a cylindrical shell 28 that has its lower end threaded so it can be easily and quickly attached to and detached from the standpipes 22, 24, and in the upper end of this shell is a removable plug 29 that is secured in place by a screw 30 which also holds a plate 31 secured to the shell 28 and preferably the plug forms a tight fit in the shell so that no large amount of water can escape between the inner surface of the shell and outer surface of the plug.

The plug 29 can be formed in the shell 28 by filling its upper end with molten metal such as babbitt or the like, and then drilling the holes for the ports, passages and bearings, after it has cooled and shrunk sufficiently to be removed from the shell.

The plug 29 is provided with a center bore 32 that forms a bearing hole for the cylindrical hollow body 33 of the nozzle 34 so that in use the body can rotate in the plug.

The plug 29 is provided with passages 35 that in one form of plug terminate in an annular chamber 36 around the body 33 and extending through the body are side orifices 37 that are in full register with the annular chamber when in use, but when not in use these orifices 37 are partly out of register with the chamber as the body 33 is arranged to move downward by gravity and endwise of the shell when not in use, so that a notch 38 in a disk 39 integral with the body 33 will engage a stop pin 40 in the plug 29 and stop the nozzle in a predetermined position, the purpose of which will be explained later.

The body 33 is moved upward by pressure of water in the standpipes acting on the plugged end 41 of the body; and the upward movement of the body is limited by the top stop 42 engaging the disk 39.

The stop 42 is integral with the top end of the plate 31 and extends partly around the nozzle 34 above the disk 39. This stop is arranged so that there is sufficient clearance between it and the top of the pin 40 for the disk 39 to rotate freely between them when the sprinkler is in use or when the water pressure has forced the body 33 upward a sufficient distance to release the disk 39 from the pin 40.

Integral with the top end of the hollow body 33 is the nozzle 34 that can have one or more discharge arms 43, as indicated in the drawing. Preferably there are two of these arms extended horizontally in opposite directions with their discharge ends bent rearward and upward, as best shown in Figs. 2 and 3.

The notched disk 39 and stop pin 40 are used when a plug 29 without the annular chamber 26 is secured to the shell 28 to stop the body 33 when its side orifices 37 are in register with the port or ports 44 that are at the upper ends of the passage or passages 35 in the plugs 29.

In other words, when the plug 29 is formed without the annular chamber 36, as shown in Figs. 10 and 12, the ports 44 are employed to connect the passages 35 with the orifices 37, so that the water under pressure can instantly enter the body when turned on to rotate the nozzle with sufficient force to cause it to make a complete revolution, thereby intermittently bringing the opening or orifice 37 into register with the port or ports 44.

In Fig. 10 there are two orifices 37 in the body 33 and two ports 44 in the plug 29 so that on each half revolution of the nozzle the ports and orifices are in register and consequently throw intermittently two sprays of water in opposite directions, as indicated in Fig. 11, so that a long narrow strip of ground can be irrigated.

In Fig. 12 the body has a single orifice 37 and the plug a single port 44, consequently these openings are in register but once in each revolution of the nozzle, and when so constructed the nozzle 34 preferably is provided with but one arm 43 so that intermittently it throws a single spray of water in one direction on each revolution, as indicated in Fig. 13.

It is obvious that when the plug 29 is provided with an annular chamber 36 around the nozzle body 33 and there is a water pressure in the standpipe 22 that the nozzle 34 will be rotated, thereby throwing a constant or continuous spray of water over a circular area, as indicated in Fig. 3.

When the rotary sprayer is attached to a standpipe 24 it will throw a circular spray out over the top of the tree 25 so as to practically envelop it in a misty spray, as indicated by the dotted lines 45.

It is understood that, in an extensive underground system for spraying, there are a large number of standpipes each equipped with a rotary sprayer and that all of these sprayers can be constructed substantially alike, except as to the plugs 29 that may be formed differently, as previously indicated, for the purpose of throwing a spray out in one or more directions without throwing it out of bounds, as outside of a person's property line.

In other words with a nozzle so constructed it can be arranged to intermittently and economically throw a spray of water off into the corner of a field or along a line fence or onto a single bush or tree where the use of a sprayer covering a large area would waste a large amount of water.

In operation the rotary sprayer is attached to the standpipe, as stated, and when the water pressure is turned on it will first act on the plugged end of the body 33 to force it upward and release the disk 39 from the pin 40, so that the nozzle can rotate to throw a continuous spray of water over a large circular area if the plug is provided with an annular chamber 36. If not the spray is discharged intermittently either in one or more directions according to the number of ports 44 in the plug and orifices 37 in the body.

As previously indicated, the plugs 29 are removable and interchangeable. In other words, by removing the screws 30 the plugs without the annular chamber 36 are interchangeable with the one with it, and when so interchanged the rotary sprayer is changed from an intermittent to a constant sprayer or vice versa.

It is obvious that this rotary sprayer can be attached to any of the movable standpipes used in lawn sprinkling; but for the sake of brevity only the underground form of standpipe is shown.

The plug 41 is removable so that when removed the water passes directly through the body 33 to the nozzle and moves it endwise so as to disengage the pin 40 and also rotates the nozzle so as to throw a continuous circular spray, in which event the plug 39 is not provided with the passages 35.

I claim as my invention:

1. A rotary sprinkler for irrigating lawns and the like including a cylindrical shell detachably connected to a standpipe from which water under pressure can be discharged, a plug detachably secured in one end of said shell that has passages therein that are connected by ports to a center bore through said plug, a hollow body revolubly mounted in the center bore of said plug that has orifices adapted to register with the ports in said plug, a stop on said plug arranged to engage a disk on said body and hold it when idle so that its orifices are in register with the ports in said plug, means for moving the disk out of engagement with said stop when water in said shell is under pressure so that said body can revolve, and a nozzle on said body from which water is discharged so as to revolve said body.

2. A rotary sprinkler for irrigating lawns and the like, including a cylindrical shell detachably connected to a standpipe from which water under pressure can be discharged, a plug detachably secured in one end of said shell that has passages therein that are connected by ports to a center bore through said plug, a hollow body revolubly mounted in the center bore of said plug that has orifices adapted to register with the ports in said plug, a stop pin on said plug, a notched disk on said body that is arranged to engage said pin and hold said body from rotation so its orifices are in register with the ports in said plug when said sprinkler is idle, means for moving said body endwise of said shell to disengage said disk from said pin so that said body can rotate when said sprinkler is in use, and a top stop above said disk for limiting the upward endwise movement of said body.

3. A rotary sprinkler for irrigating lawns and the like, including a cylindrical shell detachably connected to a standpipe from which water under pressure can be discharged, a plug detachably secured in one end of said shell that has passages therein that are connected by ports to a center bore through said plug, a hollow body revolubly mounted in the center bore of said plug that has orifices adapted to register with the ports in said plug, a stop pin on said plug, a notched disk on said body that is arranged to engage said pin and hold said body from rotation so its orifices are in register with the ports in said plug when said sprinkler is idle, means for moving said body endwise of said shell to disengage said disk from said pin so that said body can rotate when said sprinkler is in use, a top stop extending partly around said body and arranged above said disk for limiting the upward endwise movement of said body, a nozzle integral with said body, and arms to said nozzle for the purpose specified.

In witness whereof, I have hereunto affixed my signature.

WILLIAM H. BARNER.